US011914351B2

United States Patent
Jeschin et al.

(10) Patent No.: US 11,914,351 B2
(45) Date of Patent: Feb. 27, 2024

(54) INTEGRATION OF A PLURALITY OF INSTALLATION MODULES EACH HAVING AT LEAST ONE PROCESS-TECHNICAL UNIT TO FORM A MODULARLY CONSTRUCTED OVERALL INSTALLATION

(71) Applicant: Phoenix Contact GmbH & Co. KG, Blomberg (DE)

(72) Inventors: Jörg Jeschin, Einbeck (DE); Claus Vothknecht, Schlangen (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 206 days.

(21) Appl. No.: 17/311,133

(22) PCT Filed: Dec. 5, 2019

(86) PCT No.: PCT/EP2019/083779
§ 371 (c)(1),
(2) Date: Jun. 4, 2021

(87) PCT Pub. No.: WO2020/115186
PCT Pub. Date: Jun. 11, 2020

(65) Prior Publication Data
US 2021/0382461 A1    Dec. 9, 2021

(30) Foreign Application Priority Data
Dec. 6, 2018 (BE) .................................. 2018/5858

(51) Int. Cl.
*G05B 19/418* (2006.01)

(52) U.S. Cl.
CPC ............ *G05B 19/4188* (2013.01); *G05B 2219/31001* (2013.01)

(58) Field of Classification Search
CPC ...... G05B 19/4188; G05B 2219/31001; G05B 19/41845; G05B 19/042; Y02P 90/02
See application file for complete search history.

(56) References Cited

U.S. PATENT DOCUMENTS 4,527,247 A * 7/1985 Kaiser ..................... A01G 9/26
710/1
7,729,792 B2 * 6/2010 Lucas ........................ G06F 8/71
700/108

(Continued)

FOREIGN PATENT DOCUMENTS

CN      105629753 A    6/2016
CN      107422660 A    12/2017
(Continued)

OTHER PUBLICATIONS

Authorized Officer: Nora Lindner, English translation of the International Report on Patentability issued in counterpart PCT application No. PCT/EP2019/083779, dated Jun. 8, 2021, 8 pp.

(Continued)

*Primary Examiner* — Chad G Erdman
(74) *Attorney, Agent, or Firm* — Kaplan Breyer Schwarz, LLP

(57) ABSTRACT

A system and method includes integrating a plurality of installation modules each having at least one process-technical unit which, besides hardware, also houses control technology, to form a modularly constructed overall installation. The installation modules are arranged three-dimensionally and, according to the description of the overall installation, are connected mechanically and electrically to one another. Between the installation modules, at least one coupling for data exchange is formed via one or more communication protocols. A configuration of the overall installation is assembled and stored on a central server unit having a data link to the installation modules. Each instal- (Continued)

lation module is allocated at least one access path to the configuration. After the installation modules have been started, each installation module forms a connection to the configuration via the access path, reads configuration data respectively intended for the installation module to be read via the access path and, in accordance with the configuration data read, forms the communication links to at least one further installation module, wherein links are formed between individual data objects and also service interfaces are requested, and the installation modules provide the relevant function thereof to the outside via data points and services.

10 Claims, 5 Drawing Sheets

(56) References Cited

U.S. PATENT DOCUMENTS

| | | | |
|---|---|---|---|
| 2002/0194365 | A1 | 12/2002 | Jammes |
| 2007/0147268 | A1 | 6/2007 | Kelley et al. |
| 2009/0282165 | A1 | 11/2009 | Jammes |
| 2011/0144931 | A1 | 6/2011 | Smit |
| 2012/0188063 | A1 | 7/2012 | Abbot et al. |
| 2012/0265360 | A1 | 10/2012 | Smit |
| 2017/0068266 | A1* | 3/2017 | Enyedy .............. G05F 1/66 |
| 2019/0041831 | A1* | 2/2019 | Albers ............ G05B 19/4183 |

FOREIGN PATENT DOCUMENTS

| | | |
|---|---|---|
| CN | 108475045 A | 8/2018 |
| CN | 108713174 A | 10/2018 |
| DE | 4125374 C2 | 3/1995 |
| DE | 102007043652 A1 | 4/2009 |
| DE | 102008057751 B4 | 3/2011 |
| DE | 102014222508 A1 | 5/2016 |
| DE | 102015003219 A1 | 9/2016 |
| DE | 102016201075 A1 | 7/2017 |
| DE | 102016201077 A1 | 7/2017 |
| EP | 0698837 B1 | 4/1997 |
| EP | 1068708 B1 | 3/2012 |
| EP | 3246773 A1 | 11/2017 |
| WO | 03088620 A1 | 10/2003 |
| WO | 2005059572 A1 | 6/2005 |
| WO | 2006079569 A1 | 8/2006 |
| WO | 2017129606 A1 | 8/2017 |

OTHER PUBLICATIONS

Office Action issued in counterpart Belgian patent application No. BE2018/5858, dated Aug. 8, 2019, 14 pp. w/ translation.
Office Action issued in counterpart German patent application No. 10 2018 131 119.2, dated Jul. 30, 2019, 20 pp. w/ translation.
Authorized Officer: Messelken, M, International Search Report issued in counterpart PCT application No. PCT/EP2019/083779, dated Mar. 6, 2020, 11 pp.
Office Action issued in Chinese Patent Application No. 201980081127.1 dated Aug. 19, 2023 and English Translation thereof.

* cited by examiner

INTEGRATION OF A PLURALITY OF INSTALLATION MODULES EACH HAVING AT LEAST ONE PROCESS-TECHNICAL UNIT TO FORM A MODULARLY CONSTRUCTED OVERALL INSTALLATION

FIELD

The invention relates to a system and a method for integrating a plurality of installation modules each having at least one process-technical unit to form a modularly constructed overall installation.

BACKGROUND

As is known, the vast majority of processing installations today are controlled by a central computer using the central management system (CMS) of a digital control system (DCS). This central computer is connected to all sensors of the system via a fieldbus system or directly via cables (t4-20 mA). All relevant control processes are taken over centrally by this computer. In recent years, however, there has also been a need for new products in ever smaller batch sizes. Since a production that is based on a central control concept can usually only be adapted slowly to changing products and production conditions or the associated process conditions, technology has been developed that provides better results, and in particular shorter engineering times and more flexible production conditions. This technology is known under the keyword MTP (Module Type Package) and relates to the development of process units (modules), in particular chemical units, that can be assembled again and again. MTP (Module Type Package) defines and describes the interfaces and functions of the automation technology of such modules, so that it is ultimately possible to integrate such modules into a higher process control level. The concept here consists of substantially autonomous production or process modules, each of which is automated by a small controller. Such modules are described, for example, in DE 10 2016 201 075 A1.

SUMMARY

To integrate such modules into the process control level, they can then be connected simply and quickly to a central control system, for example using an MTP software container, as shown in FIG. 1, which leads to significantly faster and more efficient engineering than was possible in the past. For this purpose, each module, assigned the reference numerals 1 to 4 in FIG. 1, provides a standardized service description and an object list. Both are described in a so-called exchange or description file, usually in a standard format AML (Automation Markup Language), which is a neutral, XML-based data format for storing and exchanging installation planning data and is available as an open standard, and thus ensures a smooth connection of the modules to the central control system. In this file used in the context of MTP, all information necessary for the integration of data into the process control level is summarized. The modules have control technology, usually designed as a programmable logic controller, which controls the module and in particular the hardware contained therein for carrying out a function of a technical process, and which also communicates with the relevant management system, assigned the reference numeral 5 in FIG. 5, OPC UA usually being used for the communication 6 or the data exchange between the modules 1 to 4 and the central management or control unit 5. As is known, OPC UA ("Open Platform Communications Unified Architecture") describes a collection of specifications for communication in the field of industrial automation and M2M communication, which relate to both the transport of data and also interfaces, security mechanisms and the semantic structure of data, such as measured values, sensor data, controlled variables, or control instructions.

The central management or control unit orchestrates the autonomous modules and thus ensures that the relevant product can be produced to the desired level of quality, wherein, besides communication, i.e., online communication during the process, also the configuration of the overall installation and thus of the individual modules is always controlled by the central management or control unit (CMS/DCS). However, there is a need on the market for the autonomous units to communicate with one another. This requires a decentralized link of autonomous modules. Both the link during the engineering phase, in particular the process control level (PCL), and the online data exchange during production must be taken into account.

In contrast, DE 10 2016 201 075 A1 proposes a system for carrying out a process by means of a technical installation, in which a plurality of such autonomous modules is provided as well as a query module and a network which connects the autonomous modules and the query module to one another, the query module being able to request a service for an end product from the modules via the network. The query module can communicate with the autonomous modules via the network and send a request for an end product to said modules. If this request is heard by an autonomous module that provides the end product as an output product, this autonomous module then requests that the other autonomous modules provide it with its required input products in the desired quantity, at the desired time and in the desired state. If corresponding autonomous modules then respond, they in turn request the required input products from other autonomous modules. A technical process is gradually built up which, with the corresponding autonomous modules, leads to the end product requested by the query module, the starting point of such a process usually being an autonomous module that stores an input product from another autonomous module and makes it available thereto.

A prerequisite for this approach, however, is that for such an interconnection of the modules and the corresponding coupling of the relevant services, each of the autonomous modules must always have a completely self-contained function.

Unfortunately, this is often different in reality.

The solution according to the invention is characterized by a method and a system for integrating a plurality of installation modules each having at least one process-technical unit to form a modularly constructed overall installation according to claim 1 or claim 7.

The invention consequently provides a method for integrating a plurality of installation modules each having at least one process-technical unit which, besides hardware for carrying out a function of a technical process, also houses control technology, to form a modularly constructed overall installation, in which method installation modules are arranged three-dimensionally and, according to a description of the overall installation, are connected mechanically and electrically to one another such that, between the installation modules, at least one coupling for data exchange is formed via one or more communication protocols. A configuration of the overall installation is assembled and stored on a central server unit having a data link to the installation modules, and each installation module is allocated at least one access path to the stored configuration. The installation modules are then started, and each installation module then forms a connection to the stored configuration via the access path, reads configuration data respectively intended for the installation module to be read via the access path and, in accordance with the configuration data read, forms the communication links to at least one further installation module, wherein links are formed between individual data objects and also service interfaces are requested, and the installation modules provide the relevant function thereof to the outside via data points and services.

For this purpose, the invention also proposes a corresponding system according to claim 7.

A significant advantage over the prior art can therefore be seen in the fact that the solution according to the invention does not comprise a central DCS system and instead the tasks of the DCS are decentralized and distributed among the process-technical installation modules. In particular, the data points of the individual installation modules are also taken into consideration, such that each installation module can access external data and sensors/actuators originally assigned to another installation module via an OPC UA-based communication.

BRIEF DESCRIPTION OF THE DRAWINGS

Further advantages and features of the invention are apparent from the following description, which is by way of example, of preferred embodiments with reference to the accompanying drawings, in which.

DETAILED DESCRIPTION

Hereinafter, reference is first made to FIGS. 1 and 3 while also taking FIG. 4 into account, which each show schematically a plurality of modules integrated as an alternative to a modularly constructed overall installation, in particular integrated into the process control level. Each module, hereinafter and in the claims also referred to as an installation module, encloses a process-technical unit, in particular a unit from the field of process engineering, such as a mixing unit having access points for various materials and a valve and pump for pumping out the processed material, a reactor unit having inlets and outlets for a cooling medium of a cooling circuit or a refrigeration machine having inlets and outlets for the cooling medium. According to the definition and within the scope of the invention, such a process-technical unit has, besides hardware for carrying out a specific function of a technical process, control technology as well, in particular local PLC control technology for controlling the hardware.

Figure 1:
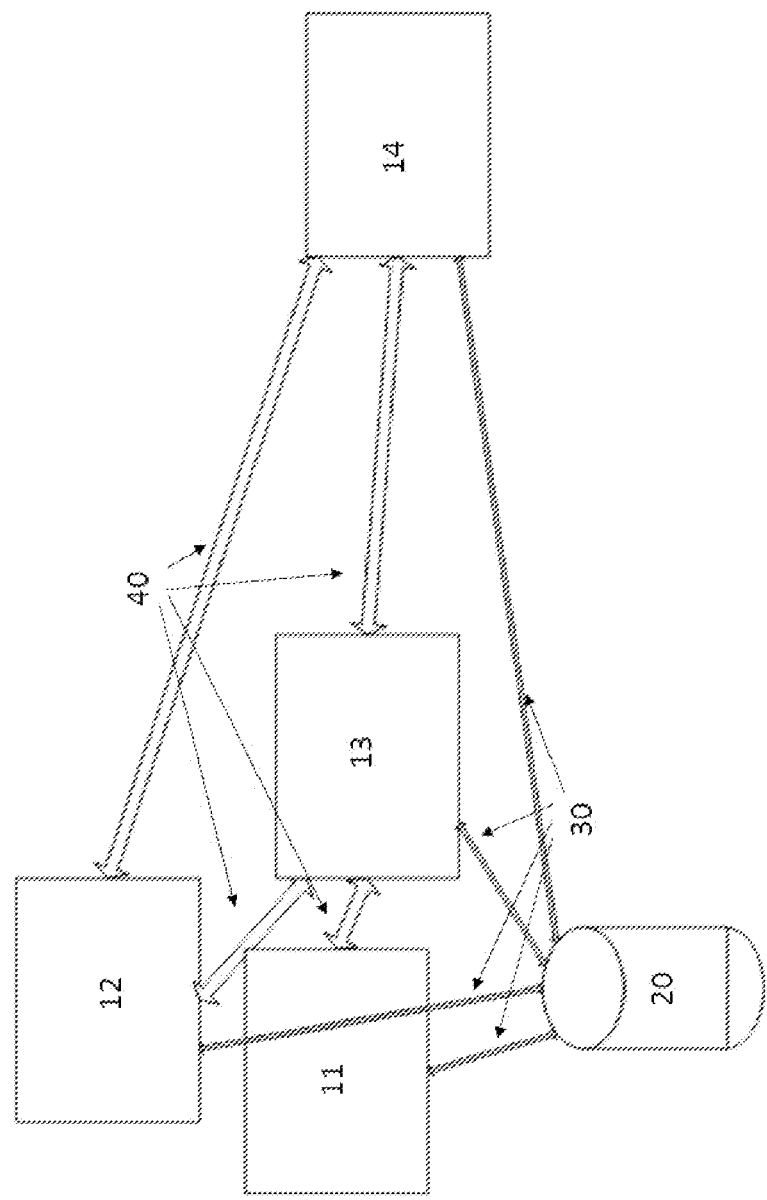
FIG. 1 is a schematic view of autonomous modules integrated into an overall installation, in particular integrated into the process control level, with access to a central data memory with the configuration of the overall installation according to the invention stored therein.
Figure 3:
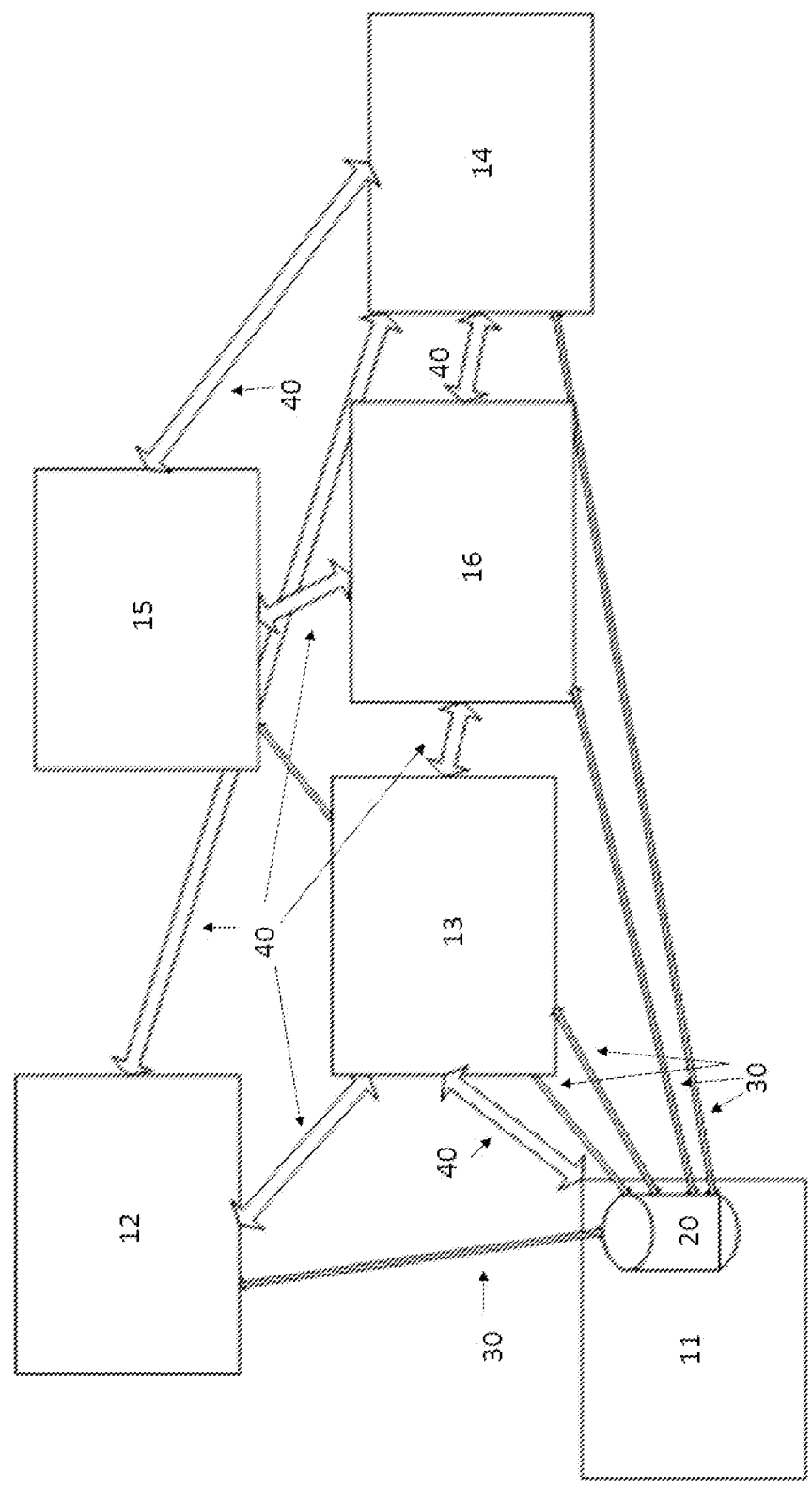
FIG. 3 is a schematic view of autonomous modules integrated into an overall installation, in particular integrated into the process control level, with access to a central data memory, which is, however, designed as part of an autonomous module, with the configuration of the overall installation according to the invention stored therein.
Figure 4:
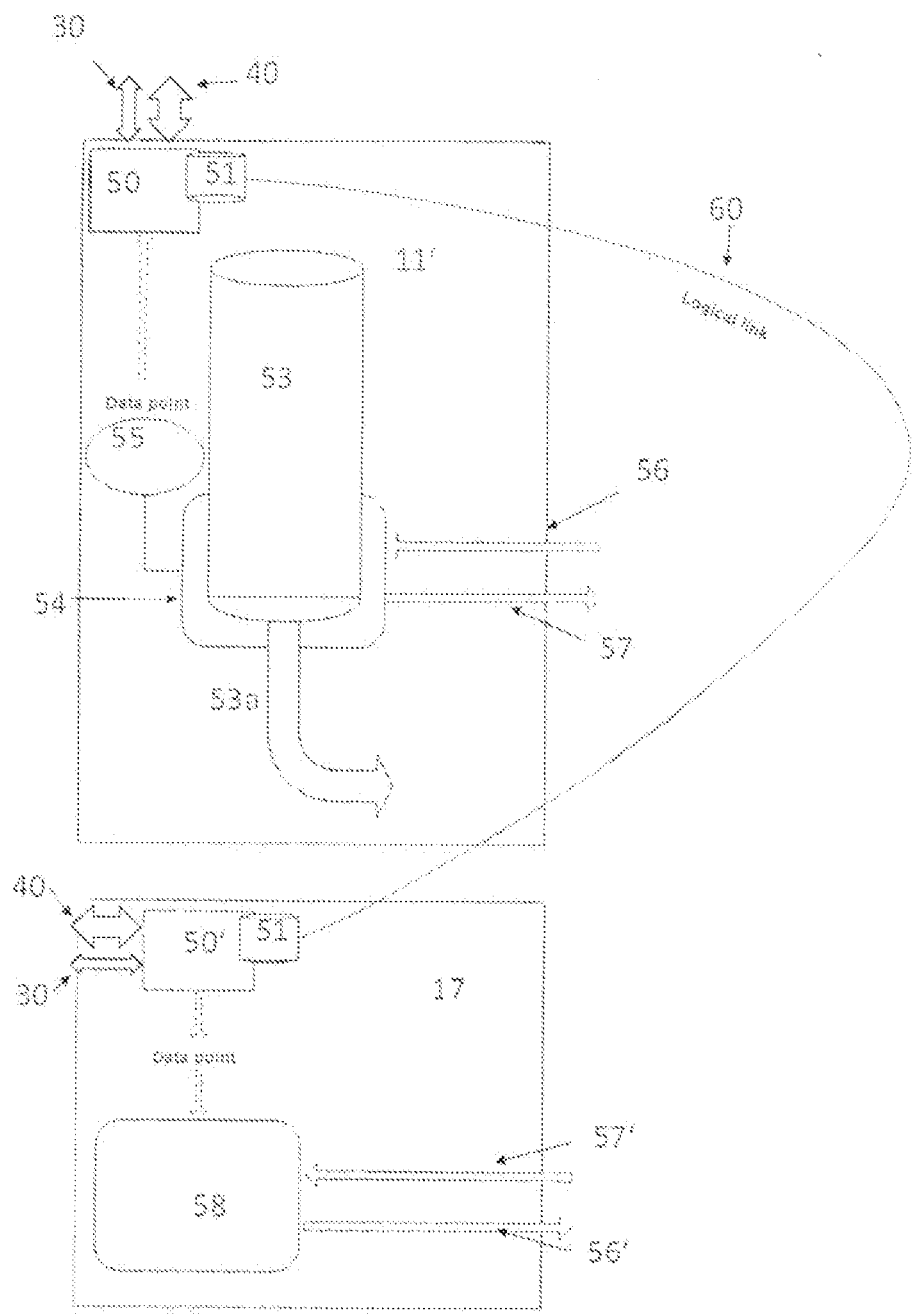
FIG. 4 is a schematic view of autonomous modules integrated into the process control level with interlinked data objects according to the invention.
Figure 5:
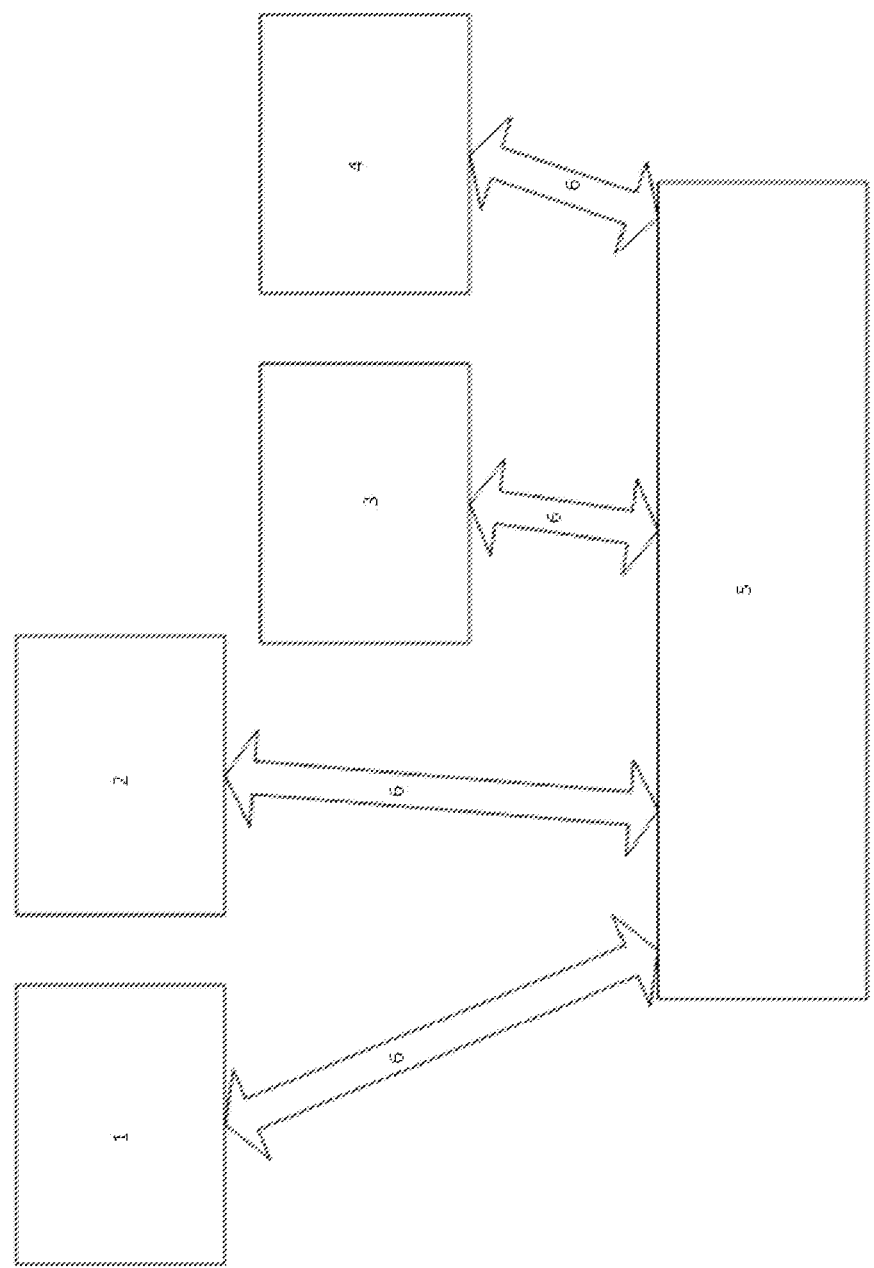
FIG. 5 is a schematic view of a connection of autonomous modules to a central control system for integration into the process control level according to the prior art.

While in FIGS. 1 and 3, for the sake of clarity, such installation modules, identified with the reference numerals 11 to 14 and 11 to 16, are only shown abstractly, in FIG. 4 two installation modules 11' and 17 are shown having such hardware and control technology 50 and 50', respectively. Thus, in FIG. 4 the installation module 11' is, for example, a reactor module and houses, as a process-technical unit, a reactor having corresponding hardware, wherein, for example, a removal option 53a for a material processed in a container is provided at the lower end of a reactor container 53. For example, the installation module 11' can thus be provided for a biotechnological application. The exemplary reactor vessel 53 is also provided with a thermal jacket 54, on which there is a temperature measuring point 55 for recording a related temperature data point. Furthermore, the installation module 11' in the example shown expediently has, as control technology 50, a local control with reactor control, to which the temperature data point recorded at the temperature measuring point is also transferred. As shown by way of example in FIG. 4, the process-technical unit of the installation module 11' is also integrated into a cooling circuit, a coolant inlet 56 and a coolant outlet 57 being shown schematically, by means of which coolant is supplied to the reactor vessel to cool said reactor vessel, and heated coolant is discharged again from the reactor vessel. For example, it can be provided that the control technology 50 has to maintain a specific temperature range within predetermined upper and lower temperature limits in order to carry out the intended function.

The further installation module 17 shown in FIG. 4 is, for example, a temperature control module and houses, as a process-technical unit, for example, a refrigeration machine 58 having corresponding hardware and, in the example shown, a local control system as control technology 50', having temperature control which processes data points, which comprise manipulated variable parameters, for temperature control of the refrigeration machine, in particular for temperature control and expediently also for supplying 56' a correspondingly tempered coolant into a cooling circuit (coolant inlet) and returning 57' heated coolant from the cooling circuit (coolant outlet) back to the refrigeration machine.

It should also be assumed that the two installation modules 11' and 17, which are shown in FIG. 4 by way of example and in greater detail compared to FIGS. 1 and 3, are connected to the same cooling circuit and, in this respect, are integrated to form a common, modularly constructed overall installation, i.e., with an installation module 11' comprising a reactor and an installation module 17 comprising a refrigeration machine for cooling the reactor.

In order to integrate the at least two (cf. FIG. 4) or a larger number (cf. FIGS. 1 and 3) of installation modules according to the invention to form a modularly constructed overall installation, the installation modules are arranged three-dimensionally and, according to the description of the overall installation, are mechanically and electrically connected to one another. As a result, between the installation modules, at least one coupling for data exchange is formed via one or more communication protocols. The basis for such a coupling for data exchange can consequently also be, for example, an Ethernet network via which the installation modules can communicate with one another, preferably using OPC UA, in particular also to form the communication connections 40 described hereafter, for which purpose in particular the respective control technologies of the installation modules can be set up with an OPC UA server (not shown in detail in the figures).

Furthermore, as can be seen in particular from FIGS. 1 and 3, a central server unit 20 is provided, which is likewise coupled for data exchange to the installation modules, on which server unit a configuration of the overall installation is stored. In order to store the configuration, the server unit therefore expediently keeps a correspondingly designed data memory ready. Such a central server unit 20, for example an SQL server (SQL—Structured Query Language), as can be seen in FIG. 3, can be part of one of the installation modules themselves, i.e., in particular the process-technical units, or, as shown schematically in FIG. 1, have a highly available, in particular independently trained infrastructure.

In order to be able to access the configuration and in particular the relevant configuration data intended for an installation module, each installation module is allocated at least one access path 30 to the stored configuration before launch, and is expediently set as a corresponding address to each module, in particular in the relevant control technology.

The connection management is also expediently set up in such a way that the connection always originates from the data sink, i.e., reading access to the configuration is always carried out. It is consequently also clear which connection is assigned to which installation module, so that the configuration data intended for each installation module are clearly specified by the relevant access path. Such an expedient connection management therefore not only applies to the access to the configuration but in particular also to the communication connections 40 described below, which are to be formed according to the read-out configuration data. Because of connections always originating from a data sink, i.e., reading connection accesses, it can also be ensured, with regard to the communication relationships between the installation modules, that even a single, autonomous installation module can be controlled in a safe mode if such a data connection is lost. If connections originating from a data source, i.e., writing connection accesses, are also used, there is a risk that a "described" installation module will not know what to do in the event of data transmission losses and would therefore be unsafe in the understanding of the process industry.

When launching the overall installation, i.e., when starting or "booting" the installation modules, these are also set up to form a connection to the stored configuration via the respectively assigned access path and to read out configuration data specific to the installation module. It is known that appropriate services are usually available for such a connection setup and reading, depending on the underlying protocol.

Each installation module, or the relevant control technology thereof, then sets up the communication connections 40 corresponding to the read-out configuration data and checks, in particular, for operational readiness, i.e., whether all connections are formed. A relevant installation module reading out configuration data consequently forms communication links 40 to at least one further installation module. Forming the connections in this way includes both forming links between individual data objects and calling interfaces for services, so that the installation modules in operation can make the respective functions thereof available to the outside via data points and services via direct communication with one another.

As is known, such a data object represents the IT mapping of a data point and contains the value of the data point enriched with further information such as physical size. To represent a reactor temperature of 78° C., for example, a data point value at the temperature measuring point 55 (FIG. 4) is, for example, the corresponding data object with a value "78" and a physical variable "° C." to represent a reactor temperature of 78° C.

The process-technical overall installation is consequently formed by an autonomous orchestration of these installation modules, wherein a central DCS system does not need to be comprised and the tasks of the DCS are instead performed in a decentralized manner and distributed among the process-technical installation modules.

For such a smooth integration of the installation modules, which are thus autonomous according to the invention, the installation modules 11 to 14 (FIG. 1) or 11 to 16 (FIG. 3) or 11', 17 (FIG. 4) expediently describe in turn a description file correspondingly for this purpose, which in particular contains, depending on the function to be carried out, information about parameters (constants),
information about lists of connectable data points with data type, access rights, etc.,
information about lists of offered services/service interfaces,
information about lists of services/service interfaces (stubs) to be used, and/or
possible further descriptions of alarms, etc.

On the other hand, the configuration stored in a decentralized manner contains, in an expedient embodiment, the interconnection or linking of data objects between the installation modules and the interconnection of service interfaces. A set of services can also expediently be combined to form a common service interface for an installation module, which is explained in more detail below on the basis of FIG. 2. Each installation module also knows, after reading the configuration intended for it, for example, which services/service interfaces (stubs) are to be used. These then represent, for example, the data sinks for each of which a connection to a service of another module is formed. The linked data objects can also be expediently used, for example by a first of the installation modules, to access data and/or sensors/actuators of a second of the installation modules. For example, in FIG. 4, by forming corresponding communication links 30 between the installation modules 11' and 17, a link 60 between the data object 51 contained in the control technology 50 and in the control technology 50' is established in such a way that the installation module 17 accesses manipulated and/or measured variables of the installation module 11' for its process-technical function, i.e., in the example according to FIG. 4 for temperature control, i.e., in particular accesses the reactor temperature according to the example according to FIG. 4.

If, in an expedient development, the read-out configuration data also contain parameters, then these are converted as constant values and automatically copied locally to their own data objects by a relevant installation module.

In a preferred development, a flow logic can also be part of the configuration. Such a flow logic can consequently also be loaded when reading out configuration data intended for an installation module and then executed by means of the control technology of the installation module reading out and loading the sequence logic. Such a flow logic can be a piece of PLC code, for example. For example, it could be a logic link or maximum value for a plurality of temperature measuring points. Overall, the configuration of the overall installation can consequently be designed to be substantially more flexible. Alternatively, the necessary control logic for the (partial) method to be executed by this installation module is already completely stored in the control technology of a relevant installation module.

Depending on the design, an operating mode, for example the actual process start of the overall installation, or different operating modes can then be triggered, for example by an external trigger, and additionally or alternatively be controlled by exchanged services and/or data objects and/or hardware switches coupled to inputs and/or outputs for recording data points. In practice, however, this usually requires an explicit action and can, for example, also take place using a visualization page on a web interface.

The configuration data can expediently also be monitored by the individual installation modules during operation via the access paths 30. If changes occur in the configuration data of one or more installation modules, these can consequently be adopted immediately or after re-initialization, depending on the execution and/or the status of the process. In the simplest case, these can be adjusted parameters for optimizing the process or the method. However, expansions and/or changes to the overall installation can also be handled flexibly in this way. The configuration data can be monitored for changes, depending on the technical solution used, for example by means of a polling method or an event-based protocol.

Figure 2:
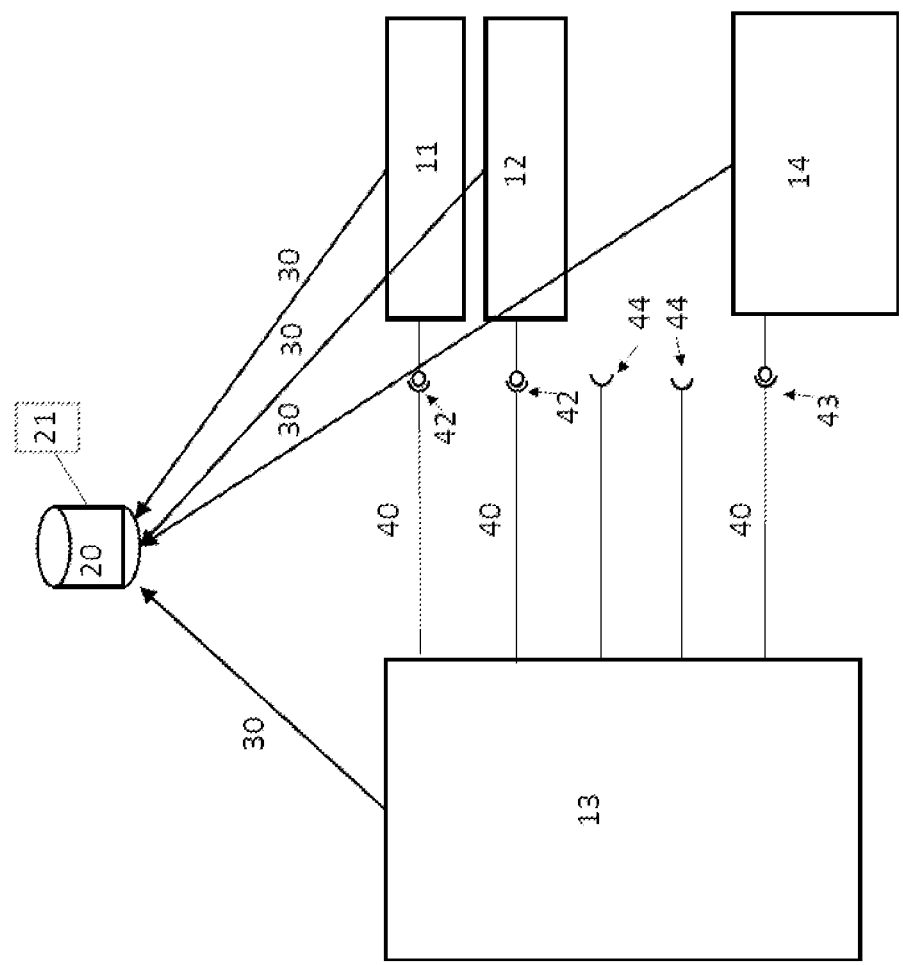
FIG. 2 is a schematic view of autonomous modules integrated into the process control level with interconnected service interfaces according to the invention.

If, consequently, an overall installation for carrying out one specific installation module, according to FIG. 1 and also including FIG. 2, is formed from four such installation modules 11, 12, 13 and 14 according to the invention, installation modules 11 and 12 can be receiver or supply modules. Furthermore, the installation module 13 is, for example, a reactor module and the installation module 14 is, for example, a storage tank module. Thus, for example, substances are conveyed by the installation modules 11 and 12 into the reactor module and, after the reaction, the substance produced is transported to the storage tank module. From there, the finished product can then be removed later, for example.

As described above, the services and communication relationships required for this, as well as the interconnection of data objects, are configured without a central controller and stored on the central data memory server 20. Each installation module is allocated an access path 30 to the location of the configuration data and the installation modules are thus able, after starting accordingly, to autonomously read out the configuration data intended for them and to act as part of the modular overall production (cf. also FIG. 2a).

In FIG. 2, by way of example and for the sake of clarity, the formed communication relationships 40 between the installation modules are only shown schematically with regard to the called service interfaces or, in particular, linked service interfaces 42, 43, for which a set of service interfaces is preferably combined.

For example, the services of an initialization, a preliminary cleaning and a subsequent substance supply are combined for the common service interfaces 42, which, according to the embodiment, relate to the interaction between the reactor module and the supply modules.

The configuration data could therefore comprise, for example, the following service configuration combined to form the service interface 42:

```
interface IFeed
{
    void Initialization(...);
    void Cleaning(...);
    void PumpMaterial(...);
    ...
}
```

Of course, other and/or further services can also be comprised. In this case, it can also be defined, for example, that the substance supply should only start after a predetermined time lapse following the preliminary cleaning.

Furthermore, the common service interface 43 relates, for example, to the interaction between the reactor module and the storage tank module. Services combined for this purpose can, for example, relate to the basic initialization as well as a valve check and the subsequent inerting of the storage tank.

The configuration data could therefore comprise, for example, the following service configuration combined to form the service interface 43:

```
interface IStorage
{
    void Initialization(...);
    void CheckValveStatus(...);
    void Inerting(...);
    ...
}
```

In principle, other and/or further services can also be combined with regard to the service interface 43.

As can be seen in FIG. 2, two further service interfaces 44 of the installation module 13 are not linked. By way of example, it is assumed that the installation module 13 designed as a reactor module supports up to four supply modules. In the example according to FIG. 2, initially only 2 supply modules are used in the overall installation. If one or two further supply modules were added, the service configuration combined in the configuration data to form a relevant service interface 44 could substantially correspond to that of service interface 42. An interconnection table 21 of data objects which is contained in the configuration stored on the central data memory server 20 could appear, in the example according to FIG. 2, as follows:

Reactor.FeedA=Feed1.Feed
Reactor.FeedB=Feed2.Feed
Reactor.FeedC=NULL
Reactor.FeedD=NULL
Reactor.StorageX=Storage1.Storage;

wherein Reactor.FeedA identifies a data object of the installation module 13 which is to be linked to a data object of the installation module 11, identified with "Feed1.Feed"; ReactorFeedB identifies a data object of the installation module 13 which is to be linked to a data object of the installation module 12, identified with "Feed2.Feed"; Reactor.FeedC and Reactor.FeedD identify data objects of the installation module 13 which are not yet to be linked and are therefore set to NULL, and Reactor.StorageX identifies a data object of the installation module 13 which is to be linked to a data object of the installation module 14, identified with "Storage1.Storage." As mentioned, for the sake of clarity in FIG. 2, the formed communication relationships 40 between the installation modules with regard to the linked data objects have not been included. However, the autonomous structure is substantially the same. However, as already mentioned above, such a link between data objects is shown in the example according to FIG. 4. In the overall installation shown schematically there, for example, for temperature control by the installation module 17 configured as a temperature control module, if at least one measured variable is required from the installation module 11' configured as a reactor module, this is automatically made available as a data object 51 via the corresponding link 60 without going through a PCL (process control level, DCS, PLS).

All calls to the services and also access to external data points via the linked data objects are therefore carried out directly between the installation modules without going through a central management system (CMS/DCS).

The start and control of the overall installation according to FIG. 2 or according to FIG. 4 can be carried out in these examples, for example, by manual switches on the reactor module.

If, based on the example according to FIG. 2, a different but similar product is required at a later point in time, the modular overall production installation can, for example, be expanded by a further receiver for an additive, for example by installation module 15 according to FIG. 3 and/or a mixer, for example by installation module 16 according to FIG. 3. Again, only the configuration data stored in the central data memory server 20 need to be adapted and the added installation modules are allocated corresponding access paths 30.

For example, when the overall installation is expanded by installation module 15, "Reactor.FeedC=Feed3.Feed" is added to the above interconnection table.

As also mentioned above, an installation module itself can also take on the role of central data memory, in particular if this, in particular the control technology thereof, provides sufficient computing power and data memory. This is already the case with modern programmable logic controllers (PLC). This means that modular, flexible process installations or installation parts can be formed without a central controller.

Taking the above description into account, it can be summarized once again that an overall installation according to the invention can be both modularly constructed and operated without a central controller, with a higher level of fail-safe protection through the use of at least partially autonomous processes.

The installation modules involved in each case make their interfaces available to other installation modules and also use the interfaces of other installation modules, so that both service links and data links are possible. The communications directly maintained between the autonomous installation modules based on the communication relationships stored in a centrally stored configuration thus comprise data and services, such as, in particular, queries and/or commands. While, depending on the desired overall installation, the individual, modularly integrable installation modules each bring a specific function of a technical process into the overall process, the relevant specific parameters can be specified externally and stored in the central server for storage, so that sequence variants of a process to be carried out are also extremely flexible as part of such a central stored configuration. Process logic to be adopted by one or more installation modules can also be part of the centrally stored configuration. Changes in the configuration, for example in the case of parameter adjustments, can be monitored by the installation modules and, depending on the specific execution, taken into account accordingly. For example, a sub-process affected by this can be stopped, additional installation modules can be mechanically and electrically incorporated and reintegrated into a changed process according to the changes made in the configuration after restart and automatic acceptance of the changes.

The invention claimed is:

1. A method for integrating a plurality of installation modules each having
   at least one process-technical unit, hardware for carrying out a function of a technical process, and control technology, to form a modularly constructed overall installation, wherein installation modules are arranged three-dimensionally and, according to a description of an overall installation, are connected mechanically and electrically to one another such that, between the installation modules, at least one coupling for data exchange is formed via one or more communication protocols,
   and wherein a configuration of the overall installation is assembled and stored on a central server unit having a data link to the installation modules in terms of data technology, each installation module being allocated at least one access path to the stored configuration before its launch, and the installation modules being started,
   wherein, after the installation modules have been started, each installation module carries out the steps of:
      forming a connection to the saved configuration via the access path,
      autonomously reading configuration data respectively intended for the installation module to be read via the access path,
      forming, in accordance with the configuration data read, the necessary communication links to at least one further installation module, wherein links are formed between individual data objects and also service interfaces are requested, and the installation modules provide the relevant function thereof to the outside via data points and services.

2. The method according to claim 1, wherein the linked data objects are used by a first of the installation modules to access data and/or sensors/actuators of a second of the installation modules.

3. The method according to claim 1, wherein the parameters contained in the read-out configuration data are converted as constant values and automatically copied locally to their own data objects by each installation module.

4. The method according to claim 1, wherein, when reading out the relevant configuration data, the flow logic is also loaded and then executed by means of the control technology of the installation module that is reading out and loading the flow logic.

5. The method according to claim 1, wherein at least one operating mode of the overall installation is controlled via communication links by exchanged services and/or data objects and/or hardware switches coupled to inputs and/or outputs for recording data points.

6. The method according to claim 1, wherein the configuration data contained in the configuration are monitored by the installation modules during the operation of the overall installation and, when changes are made to the configuration, are accepted immediately or after re-initialization of at least one of the multiple installation modules, wherein a polling method or an event-based protocol is used for monitoring the configuration data.

7. A system for integrating a plurality of installation modules each having at least one process-technical unit, hardware for carrying out a function of a technical process, and control technology for controlling the hardware, to form a modularly constructed overall installation, wherein the installation modules are spatially arranged and, according to a description of an overall installation, are connected mechanically and electrically to one another, in such a way that, between the installation modules, at least one coupling for data exchange is formed via one or more communication protocols, comprising:

a central server unit which is coupled to the installation modules for data exchange and on which a configuration of the overall installation is stored, wherein each installation module knows at least one access path to the stored configuration before its launch, so that after the installation modules have been started, they are set up for:

forming a connection to the saved configuration via the access path, autonomously reading configuration data respectively intended for the installation module to be read via the access path, forming the necessary communication connections to at least one other installation module according to the configuration data read out, which includes both forming links between individual data objects and calling service interfaces and the installation modules then providing the relevant function thereof to the outside via data points and services.

8. The system according claim 7, wherein the central server unit is part of one of the installation modules, in particular one of the process-technical units, or wherein the central server unit has a central, highly available infrastructure.

9. The system according to claim 7, wherein the configuration includes the interconnection of data objects between the installation modules and the interconnection of service interfaces, wherein in particular one set of service interfaces in each case is combined to form a common service interface for an installation module and/or wherein a flow logic program is part of the configuration.

10. The system according claim 7, wherein each of the installation modules is described in a description file, which contains:
   parameters,
   list of connectable data points with data type, access rights, etc.,
   list of offered services/interfaces, and/or
   list of used services/interfaces (stubs).

* * * * *